United States Patent
Hall et al.

(10) Patent No.: US 8,131,980 B2
(45) Date of Patent: Mar. 6, 2012

(54) STRUCTURE FOR DYNAMIC LIVELOCK RESOLUTION WITH VARIABLE DELAY MEMORY ACCESS QUEUE

(75) Inventors: Ronald Hall, Cedar Park, TX (US); Michael L. Karm, Cedar Park, TX (US); Alvan W. Ng, Austin, TX (US); Todd A. Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 12/132,494

(22) Filed: Jun. 3, 2008

(65) Prior Publication Data

US 2008/0301374 A1  Dec. 4, 2008

Related U.S. Application Data

(63) Continuation-in-part of application No. 11/530,612, filed on Sep. 11, 2006, now abandoned.

(51) Int. Cl.
*G06F 9/30* (2006.01)
*G06F 9/40* (2006.01)
*G06F 15/00* (2006.01)

(52) U.S. Cl. .................. 712/218; 712/216; 712/214

(58) Field of Classification Search .......... None
See application file for complete search history.

(56) References Cited

U.S. PATENT DOCUMENTS

| | | | |
|---|---|---|---|
| 6,178,493 B1 * | 1/2001 | Lenk et al. ............. | 712/28 |
| 6,230,219 B1 * | 5/2001 | Fields et al. ............ | 710/22 |
| 6,785,803 B1 * | 8/2004 | Merchant et al. ........ | 712/219 |
| 7,216,216 B1 * | 5/2007 | Olson et al. ............ | 712/220 |
| 7,353,445 B1 * | 4/2008 | Barreh et al. ........... | 714/758 |
| 7,437,539 B2 * | 10/2008 | Abernathy et al. ...... | 712/219 |
| 2008/0065873 A1 | 3/2008 | Hall | |

OTHER PUBLICATIONS

U.S. Appl. No. 11/530,612, "Dynamic Livelock Resolution with Variable Delay Memory Access Queue," Non-Final Office Action dated May 6, 2009.

\* cited by examiner

*Primary Examiner* — Eddie P Chan
*Assistant Examiner* — Corey S Faherty
(74) *Attorney, Agent, or Firm* — Yudell Isidore Ng Russell PLLC (57) ABSTRACT

A design structure for resolving the occurrence of livelock at the interface between the processor core and memory subsystem controller. Livelock is resolved by introducing a livelock detection mechanism (which includes livelock detection utility or logic) within the processor to detect a livelock condition and dynamically change the duration of the delay stage(s) in order to alter the "harmonic" fixed-cycle loop behavior. The livelock detection logic (LDL) counts the number of flushes a particular instruction takes or the number of times an instruction re-issues without completing. The LDL then compares that number to a preset threshold number. Based on the result of the comparison, the LDL triggers the implementation of one of two different livelock resolution processes. These processes include dynamically configuring the delay queue within the processor into one of two different configurations and changing the sequence and timing of handling memory access instructions, based on the specific configuration of the delay queue.

17 Claims, 5 Drawing Sheets

STRUCTURE FOR DYNAMIC LIVELOCK RESOLUTION WITH VARIABLE DELAY MEMORY ACCESS QUEUE

PRIORITY CLAIM

The present application is a continuation-in-part of U.S. patent application Ser. No. 11/530,612, titled "Dynamic Livelock Resolution with Variable Delay Memory Access Queue," filed on Sep. 11, 2006. Benefit of priority is hereby claimed under 35 U.S.C. §120 to U.S. patent application Ser. No. 11/530,612, which is incorporated by reference herein in its entirety and for all purposes.

BACKGROUND OF THE INVENTION

1. Technical Field

The present invention generally relates to design structures and in particular to design structures for dynamic livelock resolution in processor systems.

2. Description of the Related Art

To increase microprocessor performance, microarchitectures and memory subsystems employ a variety of techniques which allow multiple instructions to execute simultaneously. Superscalar instruction issue and speculative execution are two strategies that improve performance but also significantly increase overall system design complexity.

Occasionally, during instruction execution, a situation occurs whereby instructions are repeatedly issued, but a recurring transient conflict inhibits the forward progress of the execution of the instructions. This condition is called a system livelock, and may be caused by any one of a number of conflict-generating instruction execution sequences. With the addition of system bus interactions (e.g., snooped operations) and multiprocessor shared-memory architectures in conventional processing systems, the occurrences of livelocks are even more likely. In conventional systems, system livelock is typically caused by one of the following conditions: (a) repeated flushing of instructions as a result of structural hazards that consequently cause the instructions to be speculatively refetched or repeatedly being re-issued from an issue queue; and (b) "harmonic" fixed-cycle interactions between multiple processing units, where one unit inhibits the forward progress of another.

A repeated flush livelock condition commonly occurs when a "full" or "busy" resource, such as an ERAT, SPR, LMQ, STQ, etc., is unable to receive the instruction (or associated request) due to the repeated execution of a particular instruction or sequence of instructions. The above acronyms are defined as follows: ERAT—Effective to Real Address Table; SPR—Special Purpose Register; LMQ—Load Miss Queue; and STQ—Store Queue.

A harmonic livelock condition results when an instruction is repeatedly discarded. The condition that causes the instruction to be discarded is triggered where (a) an instruction enters the pipeline just before the required resource becomes available and (b) the processor changes state such that the resource is no longer able to become available when the instruction reaches that resource. This two step process then results in a harmonic livelock when certain conditions cause the above two step process to repeat indefinitely.

Execution of the code sequence below may provide a catalyst for the conditions that result in a harmonic livelock.
load A
store A
(several stores . . . )
store B (store queue full flush)
load C (flushed along with store B)

As provided, a load from cache line A (referred to as "ld A") is followed by several stores, including a store to cache line A (referred to as "st A"). In this example, the load misses the cache so the subsequent store to the same address is placed into the store queue, waiting for the load to be serviced so that correct in-order memory access to the same address will be preserved. More stores are issued, thus filling up the store queue. After the store queue becomes full, the store to cache line B ("st B") is issued. This store and all younger instructions are flushed because the store queue has no available entries.

Ld C has the same address subset for indexing the cache arrays (i.e. the same congruence class address) as ld A. In this example, the load from cache line C ("ld C") following st B was speculatively issued and sent to the memory subsystem before the store queue conflict was determined. In the case where ld A is rejected because of a collision with a previous load or store shortly before the ld C request was sent to the memory subsystem controller, the design of most conventional memory queues allow the possibility that ld C may be accepted before ld A. Due to memory access restrictions to the same cache congruence class, the memory servicing of ld C, which is accepted out of order by the memory controller, now presents a new restriction that inhibits the servicing of ld A.

Under normal operation, this method of age independent load handling provides a performance boost because this handling enables out of order instruction execution in the absence of data dependencies. However, side effects of this enhancement include unexpected problematic circular conflicts. In the above example, the ld C instruction, which blocked ld A, is flushed as a result of the st B flush. The st A instruction cannot be serviced because ld A was blocked by ld C. Once ld A is blocked, ld A is sent to the retry delay queue in the memory subsystem. A livelock condition may occur when the st B and ld C instructions are speculatively re-issued. Ld C is sent to memory subsystem controller before ld A has time to pass through the retry delay queue and attempt a memory access. Again, ld A is blocked by ld C due to the congruence class conflict. Without some intervention, this process will repeat indefinitely.

Figure 1:
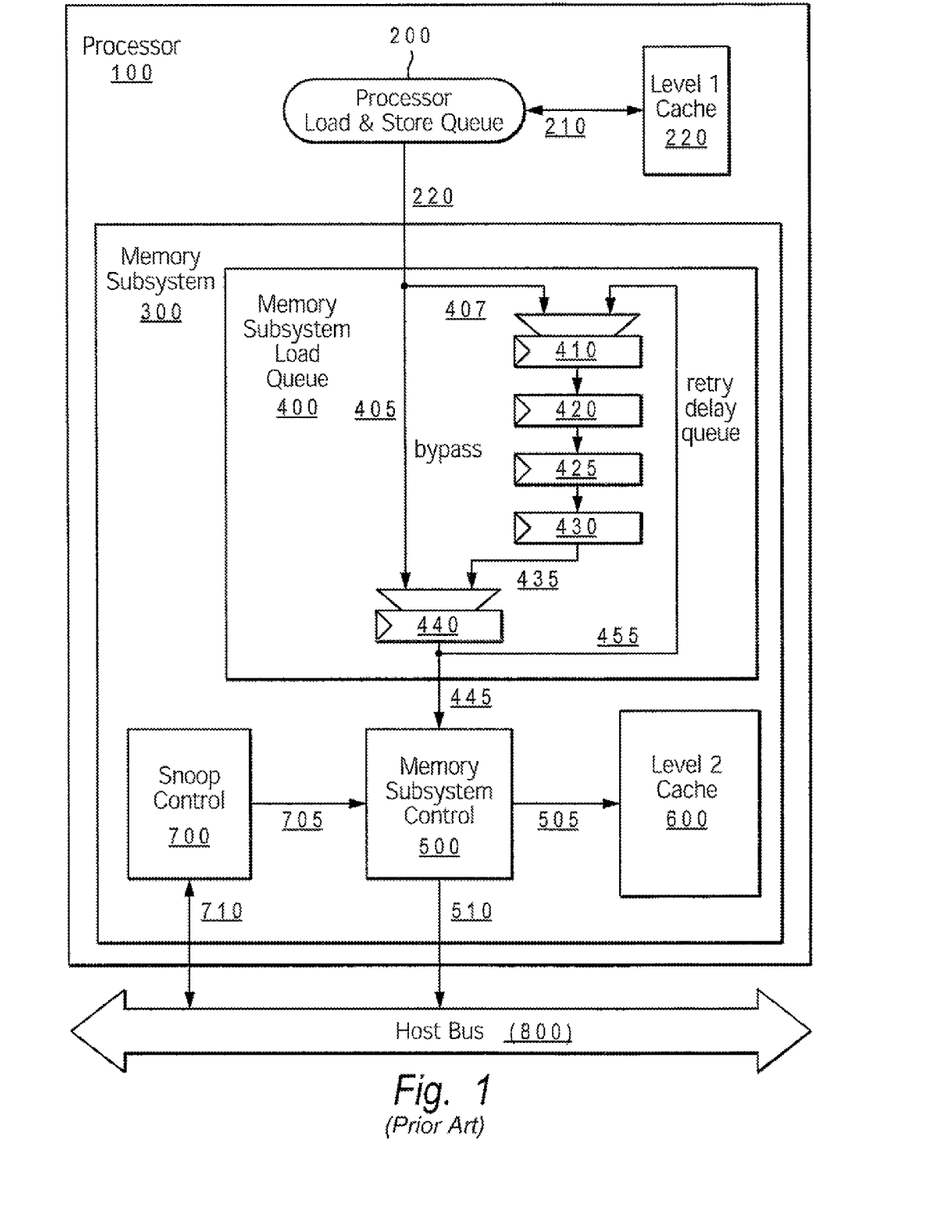
FIG. 1 is a block diagram of a processor core and memory subsystem illustrating the fixed-duration retry delay queue, according to the prior art.

The above execution process typically occurs in a conventionally designed processor system, such as that illustrated by FIG. 1. FIG. 1 depicts the configuration of a conventional processor and memory subsystem which are utilized for handling of basic instruction processing and livelock conditions, according to the prior art. FIG. 1 shows conventional load and store (Ld/St) queue 400 that serves as the staging and retry delay queue between processor core 100 and memory subsystem. The retry delay queue includes a series of sequential stages (illustrated as latches) 410, 420, 425, and 430. When Ld/St queue 400 is empty, a new request takes bypass path 405 and the request is forwarded to Memory Subsystem Controller 500. If this request is denied by memory subsystem controller 500 due to a resource conflict, the request enters first stage 410 of the retry delay queue using path 455 and travels through each stage (410, 420, 425, and 430) of retry delay queue 455. Subsequent loads or stores from the processor bypass retry delay queue 455 unless a previously delayed retry entry has reached final queue stage 430. When the previously delayed entry is in final queue stage 430, the retry request is again sent to Memory Subsystem Controller 500, while the new request enters the delay queue at stage 410 using path 407. Retry delay queue 455 provides a reasonably fair retry scheme with a pipeline that forces an instruction to wait for its conflict to clear. Waiting for any conflicts to clear then allows memory subsystem controller 500 to service new requests destined for unoccupied resources.

As described above, the processing system of FIG. 1 utilizes a fixed-duration retry delay queue. When the above sequence is executed within the processing structure of FIG. 1, several potential downsides are observed with regards to handling a harmonic livelock. Executing the example execution sequence above, ld A is rejected by memory controller 500 and placed in top of the retry delay queue at stage 410. At some time before ld A can be successfully serviced, Id C enters queue structure 400, proceeds to memory subsystem controller 500 via bypass path 405, and is accepted. The timing of this occurrence is purely by chance, but its occurrence has been demonstrated in real systems.

The servicing of ld C provides an address collision conflict which causes memory subsystem controller 500 to again reject ld A when ld A reaches the end of the queue. As described earlier, the st B instruction preceding id C is flushed causing the results of ld C to be discarded. In response to the flush, the processor core immediately retries the st B and ld C instructions, expecting the resource conflict to be resolved. Again, the ld C instruction bypasses the ld A instruction which has returned to the retry delay queue, and thus, continues to hinder the progress of ld A. A livelock occurs because instructions are repeatedly issued (st B, ld C) but the blockage of ld A caused by ld C prohibits the possibility of freeing store queue entries and thus, prohibits forward progress.

A similar livelock condition may occur when multiple threads in a Simultaneous Multithreading (SMT) processor try to access a shared resource. SMT processors alternate between multiple threads when selecting instructions to dispatch. A harmonic livelock condition may occur where one thread accesses a resource in the cycle before a second thread tries to access the same resource. The second thread is flushed because the resource is occupied by the first thread. If the first thread's progress is dependent on a result from the second thread, the system will experience livelock because forward progress is impossible when the first thread repeatedly blocks the second thread. The risk for livelocks is further increased when multiple processors share the same secondary memory system.

Livelock conditions are usually hard to predict and recreate and/or identify in simulation. The software execution bugs that cause livelocks are often found later in the hardware validation process. Breaking out of unanticipated livelock conditions presents a difficult challenge for the design of high performance microprocessors. However, designs which include advanced livelock avoidance features may save significant test and redesign expenses. Therefore, backup mechanisms are often included within a processor core. These backup mechanisms are designed to dynamically break livelock conditions.

Designing livelock correction mechanisms requires careful analysis to cover all unforeseen potential livelock scenarios. Several proposed solutions for livelock correction primarily focuses on one of (1) bus accesses between multiprocessor systems, including specific changes to writeback protocols in anticipation of livelocks [U.S. Pat. No. 6,279,085], (2) distributed synchronization and delay management of snoop requests [U.S. Pat. Nos. 6,523,076 and 6,968,431], and (3) the implementation of random arbitration schemes [U.S. Pat. No. 5,761,446]. Other solutions focus solely on data sharing livelocks [U.S. Pat. No. 6,078,981]. However, none of these proposed methods resolves the different types/forms of livelocks in an efficient manner.

Given the above problems presented by the occurrence of livelocks, the present invention recognizes that it would be desirable to provide a mechanism to efficiently resolve and reduce system livelocks within a data processing system.

SUMMARY OF THE INVENTION

Disclosed is a design structure for resolving the occurrence of livelock at the interface between the processor core and memory subsystem controller. Livelock is resolved by introducing a livelock detection mechanism (which includes livelock detection utility or logic) within the processor to detect a livelock condition and dynamically change the duration of the delay stage(s) in order to alter the "harmonic" fixed-cycle loop behavior. The livelock detection logic (LDL) counts the number of flushes a particular instruction takes or the number of times an instruction re-issues without completing. The LDL then compares that number to a preset threshold number. Based on the result of the comparison, the LDL triggers the implementation of one of two different livelock resolution processes. These processes include dynamically configuring the delay queue within the processor into one of two different configurations and changing the sequence and timing of handling memory access instructions, based on the specific configuration of the delay queue.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a design structure for resolving the occurrence of livelock at the interface between the processor core and memory subsystem controller. Livelock is resolved by introducing a livelock detection mechanism (which includes livelock detection utility or logic) within the processor to detect a livelock condition and dynamically change the duration of the delay stage(s) in order to alter the "harmonic" fixed-cycle loop behavior. The livelock detection logic (LDL) counts the number of flushes a particular instruction takes or the number of times an instruction re-issues without completing. The LDL then compares that number to a preset threshold number. Based on the result of the comparison, the LDL triggers the implementation of one of two different livelock resolution processes. These processes include dynamically configuring the delay queue within the processor into one of two different configurations and changing the sequence and timing of handling memory access instructions, based on the specific configuration of the delay queue.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 2xx for FIGS. 2 and 3xx for FIG. 3). The specific numerals assigned to the elements are provided solely to aid in the description and not meant to imply any limitations (structural or functional) on the invention.

It is also understood that the use of specific parameter names are for example only and not meant to imply any limitations on the invention. The invention may thus be implemented with different nomenclature/terminology utilized to describe the above parameters, without limitation.

Figure 2:
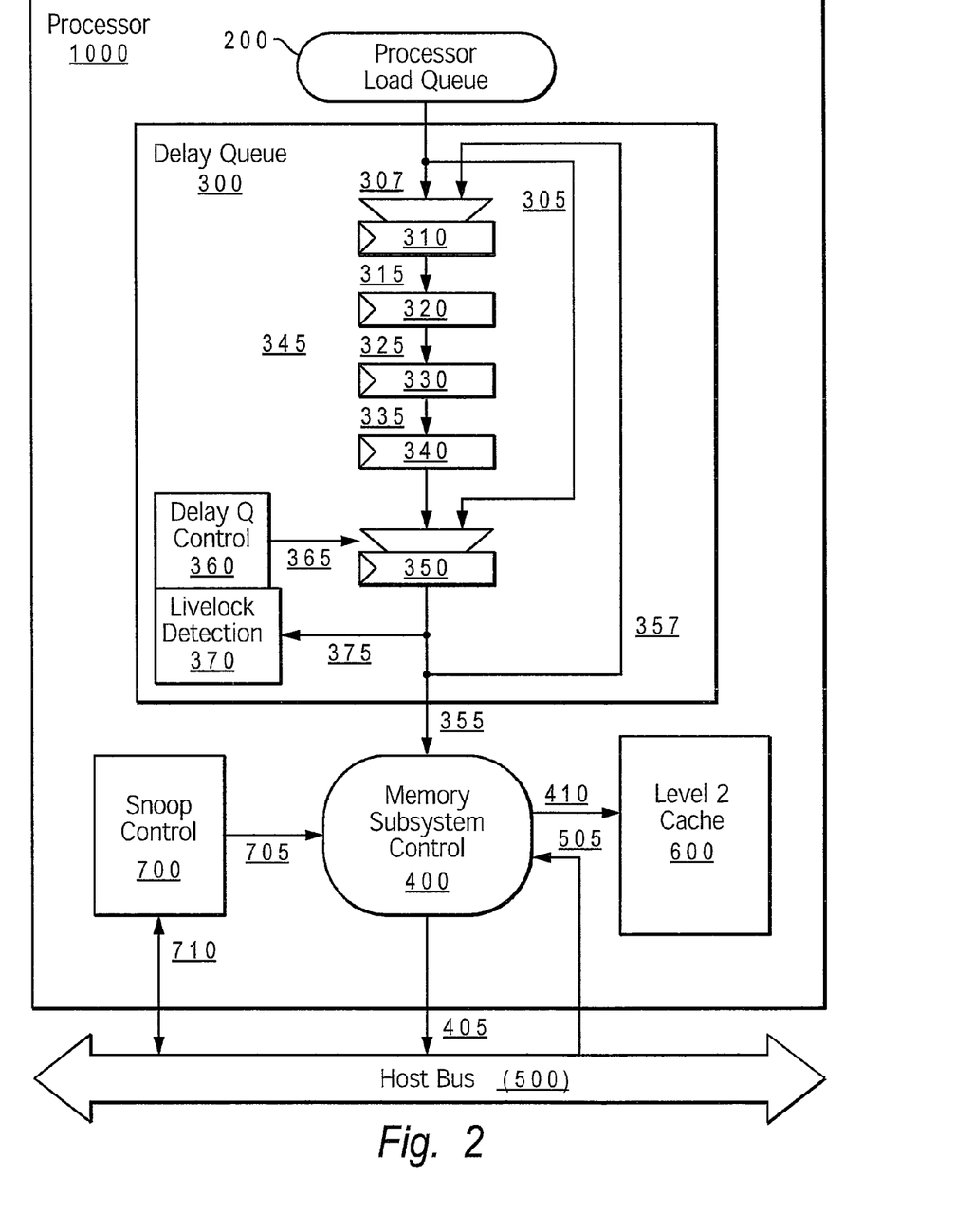
FIG. 2 is a block diagram of a processor core and memory subsystem that enables the delay bypass disable method for handling system livelock, according to one embodiment of the invention.
Figure 3:
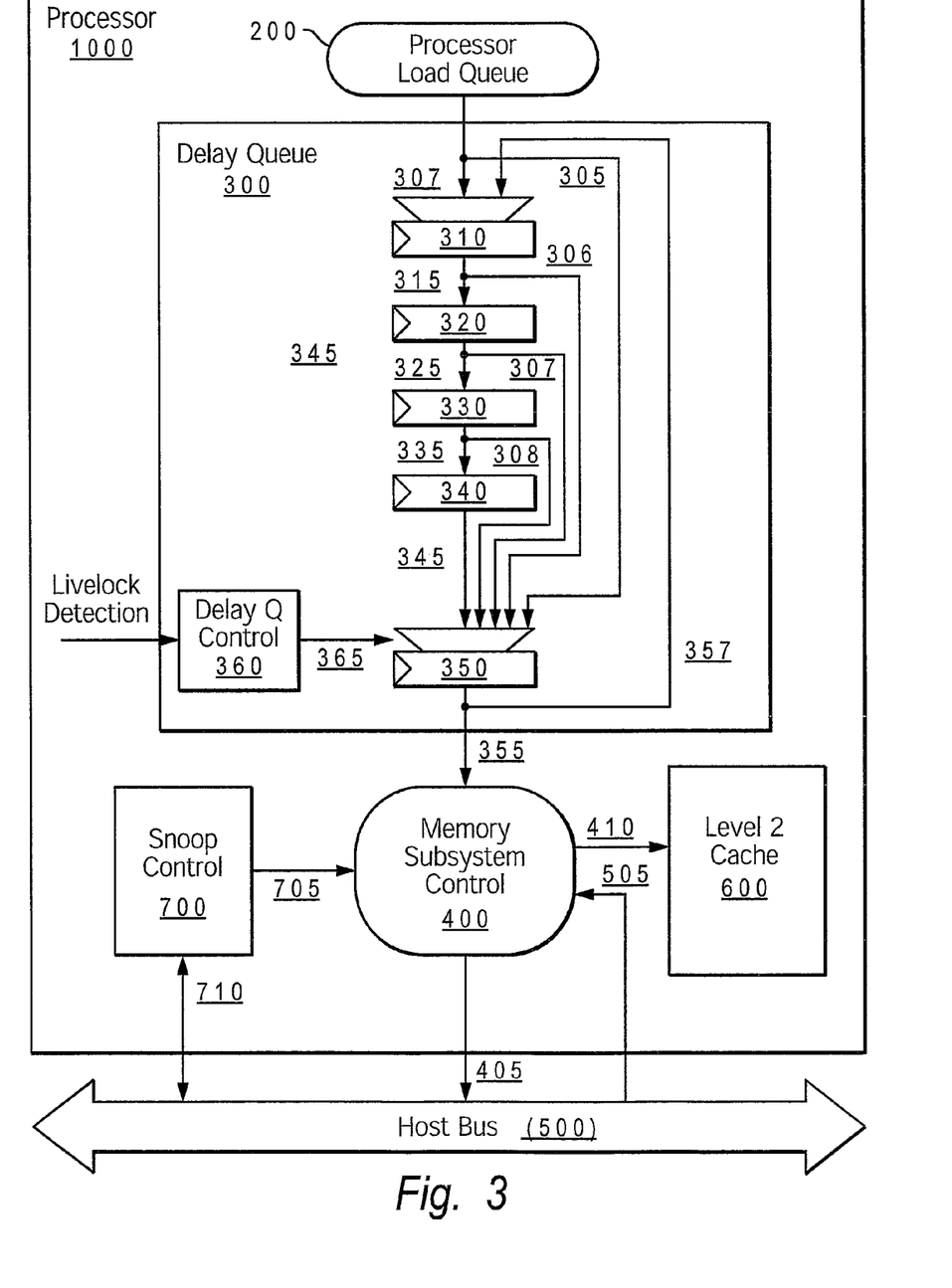
FIG. 3 is a block diagram of a processor core and memory subsystem that enables the single step instruction processing method for handling system livelock, according to another embodiment of the invention.

The following example application instruction/code sequence is utilized to illustrate the differences between livelock response operations within a conventional system (as FIG. 1) and the enhanced livelock response operations within both of the two new system configurations introduce by the invention and illustrated by FIGS. 2 and 3.

load A
    store A
    (several stores . . . )
    store B (store queue full flush)
    load C (flushed along with store B)

The present invention provides two novel configurations of processing systems, which configurations include livelock detection and response logic (also interchangeably referred to herein as livelock detection mechanism and/or livelock detection and response utility). The livelock detection and response logic enables (a) detecting different types of livelocks (i.e., livelocks caused by different types of execution missteps, as described below) and (b) dynamically varying the length of the retry delay queue to resolve livelock conditions.

According to the present invention, a livelock detection mechanism is activated/triggered when the number of times an instruction flushes or is re-issued exceeds a pre-determined threshold. To enable this tracking of the number of times, a counter is provided within livelock detection logic. Further, a threshold maximum number is established/preset as a system design parameter (or programmable by system programmer/software). The retry delay queue operation is modified to more efficiently respond to and/or resolve livelocks that are detected. The invention enables more efficient resolution of livelock via one of two different delay queue configurations to complement the particular livelock resolution process, based on a variable delay queue.

Each livelock resolution process involves a different configuration of the delay queue structure and thus the processor is designed with logic for selectively implementing either of two different delay queue configurations. In a first configuration, a single bypass path is provided around the latches within the delay queue. In the second configuration, a number of delay paths are provided after each latch to enable a more granular bypass of portions of the delay queue. Both configurations are supported by the livelock detection mechanism, which includes a delay queue controller.

The first configuration, which is illustrated by FIG. 2, forces all memory access operations to proceed through the entire delay queue by disabling the bypass path. The second configuration, illustrated by FIG. 3, adds additional flexibility by freezing the delay queue and selectively forwarding any instruction in the delay queue to the memory subsystem controller. Either method may be implemented, based on a selection mechanism that determines the type of livelock condition existing and matches the appropriate one of the methods to handle the livelock.

Turning now to the figures, FIG. 2 shows an example processing system configured with a livelock detection mechanism that provides the delay queue bypass disable method for resolving livelocks, according to a first embodiment of the present invention. The processing system comprises processor core 1000, which includes processor load queue 200, delay queue 300 memory subsystem controller 400, snoop controller 700 and level 2 cache 600. Snoop controller 700 and memory subsystem controller 400 connect via respective paths 710 and 405 to host (or system) bus 500. Other memory structures within a memory subsystem (not shown) are connected to processor 1000 via host bus 500.

Delay queue 300 comprises delay path 345, which includes a series of delay stages 310, 320, 330, 340 (provided by latches), and final stage 350. Both first stage 310 and final stage 350 have an input MUX, utilized to select one of multiple possible inputs to the particular stage, as described below. Delay queue 300 also comprises delay queue controller 360 and livelock detection logic 370, which are utilized along with delay stages 310, 320, 330, 340, final stage 350, and associated input MUXes to provide the livelock resolution features, according to the processes described below. Various signal paths are illustrated within processor 1000 and specifically within delay queue 300. These signal paths include feedback path 357 and bypass path 305. The functionality and/or specific use of these paths within the livelock resolution processes are also described below.

The example instruction sequence above is utilized along with FIG. 2 to facilitate the explanation of livelock occurrence, detection, and resolution, according to the present embodiment of the invention. Livelock detection mechanism 370 samples instructions being sent to memory subsystem controller 400 with probe 375 into the delay queue, which comprises delay stages 310, 320, 330, 340 and final stage 350. Livelock detection logic 370 is activated/triggered when the load to cache line C is flushed many times (at or above the preset threshold maximum) without completing. Delay queue control 360 forces the MUX of final stage 350 to pick path 345 instead of bypass path 305 for all new instructions.

With this adjustment, the ld A operation will be presented to memory subsystem controller 400 before the next iteration of ld C. Rather than bypass the id A instruction which is again waiting in the retry delay queue, the ld C instruction will enter the top of the delay queue (comprising delay stages 310, 320, 330, 340) and allow ld A to be serviced first. Once ld A is handled by memory subsystem controller 400, the dependent store after ld A will advance. The ld C instruction will pass through delay stages 310, 320, 330, 340 and will be serviced at some point following the servicing of ld A. Once the livelock condition is removed, delay queue controller 360 triggers the input MUX of final stage 350 to dynamically pick bypass path 305 again.

FIG. 3 shows an example processing system configured with a livelock detection mechanism that provides the single step instruction method for resolving livelocks, according to a second embodiment of the present invention. Structurally, FIG. 3 differs from FIG. 2 because of the inclusion of paths 306, 307 and 308 in FIG. 3. The livelock detection and resolution mechanisms may overlap with those illustrated within FIG. 2, and may also include additional/different functional logic to enable the variations of single step delay associated with the present method.

FIG. 3 shows how delay queue control 360 may also serve as instruction single step control as an alternative livelock breaking method. A livelock condition caused by snoop requests 705 from external bus 500 colliding with processor memory access requests 355 typically require adjustments beyond that of subtle sequencing modifications. When repeated collisions are not solved by the delay bypass disable mechanism (shown in FIG. 2), delay queue control 360 automatically adjusts the instruction flow to the second method. In this single step instruction method, delay stages 310, 320, 330, and 340 are stalled and delay queue control 360 selects each instruction individually to send to final stage 350 via respective paths 305, 306, 307 or 308. By this method of single-step instruction processing, delay queue control 360 maintains specific instruction ordering and inserts delay(s) between each instruction. The reduced pressure on memory subsystem controller 400 allows the overall sequence of requests to change. Altering the sequence and frequency of requests then solves/removes the condition that caused the recurring livelock sequence.

Those of ordinary skill in the art will appreciate that the hardware depicted in FIG. 2 and FIG. 3 may vary. For example, the depicted hardware may include additional components associated with the processor or memory subsystem. Thus, the depicted examples are not meant to imply architectural limitations with respect to the present invention.

Figure 4:
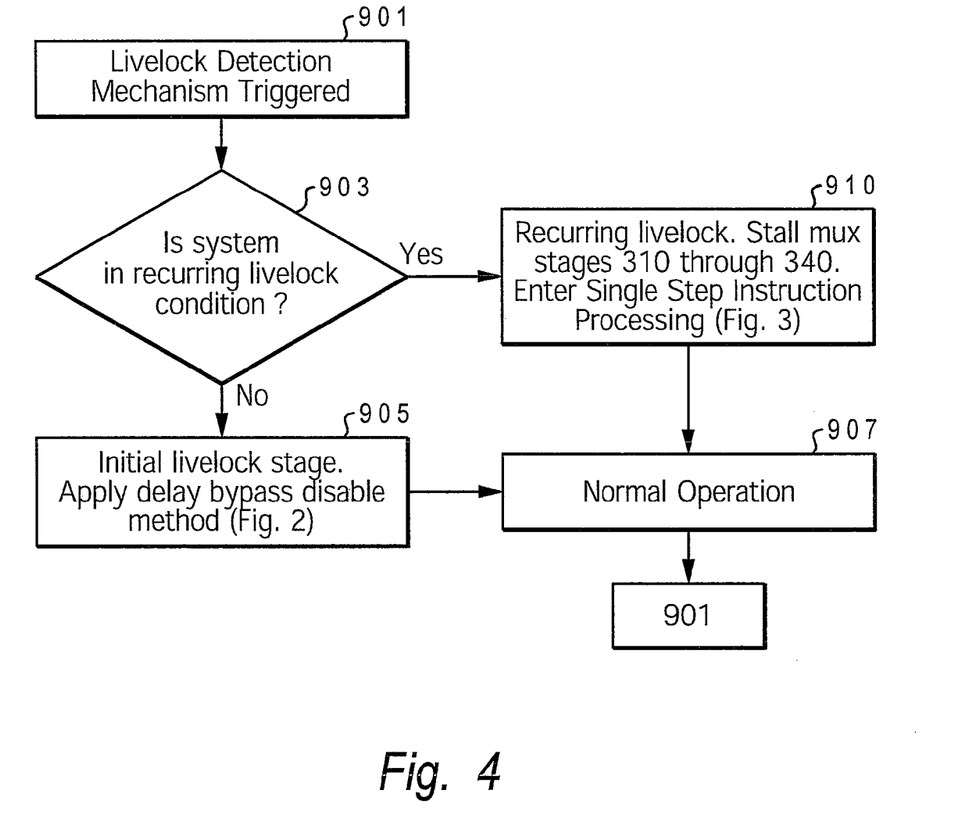
FIG. 4 is a flow-chart generally depicting the process for resolving system livelock conditions utilizing one of the processor configuration and methods of FIG. 2 and FIG. 3, according to one embodiment of the invention.

FIG. 4 is a high level flow chart illustrating the process steps used to resolve livelock via one of the two available processes and corresponding delay queue configurations, according to the present embodiment. The process begins at block 901, which depicts the livelock detection mechanism recognizing the presence of a livelock condition within the system. The livelock detection logic (LDL) checks the number of re-issues or other livelock indicators and determines at block 903 whether the livelock condition detected was an initial livelock condition or a recurring livelock condition.

If no recurring livelock condition is detected, signifying the detection of a livelock condition in its initial stage, the process enters block 905, which depicts the activation of the delay bypass disable method (describe above with reference to FIG. 2). Thus, when the LDL resolves that the number of re-issues is below a threshold number, indicating an initial livelock stage (i.e., a non-recurring livelock), the delay queue controller activates/implements the first delay queue configuration. In this first configuration, the livelock detection logic (LDL) enables the staging MUX for the final queue stage to select new instructions from the delay queue path rather than the bypass path. New instructions are thus delayed while the retried instruction is resent to the memory controller, and are not bypassed.

However, If a recurring livelock condition is detected, which was not resolved by the delay bypass disable method (of FIG. 2), the process enters block 910, which indicates the activation of the single step instruction processing mode (described above and illustrated by FIG. 3). Thus, when the number of re-issues is at or above the threshold number, indicating a recurring livelock condition, the delay queue controller automatically activates/implements a second delay queue configuration. In this second configuration, the LDL implements a single step instruction processing to maintain specific instruction ordering and adjust the instruction flow. This ordering is achieved by inserting a delay between each instruction. The delay queue controller then selects each instruction within a delay stage individually to send to the final queue stage via the respective bypass paths following the delay stage.

Once the livelock is resolved by either of the above methods, the process enters block 907, at which point normal operation resumes, until a next livelock condition is detected. Implementing the above dual-method livelock resolution mechanism results in a change in the sequence and timing of handling memory access instructions and ultimately resolves the livelock condition.

Implementing the above livelock detection and resolution mechanisms causes a change in the sequence and timing of the handling of memory access instructions which quickly resolves the livelock condition. The mechanism alters memory instruction access timing in the load/store interface. By altering memory instruction access timing in the load/store interface at the point where a livelock is caused, the amount and complexity of additional logic required is minimized. Also, performance is significantly increased, when compared to alternate approaches that rely on changing the instruction sequence in a processor core's pipeline. Unlike these alternate approaches, the mechanism completes the resolution of livelock without requiring lengthy flushing and single-step operations for all instructions. In addition, a subtle change to the sequence and timing of the handling of memory access instructions in the retry delay queue breaks the livelock quicker than altering the behavior of the instruction flow in the processor core.

Figure 5:
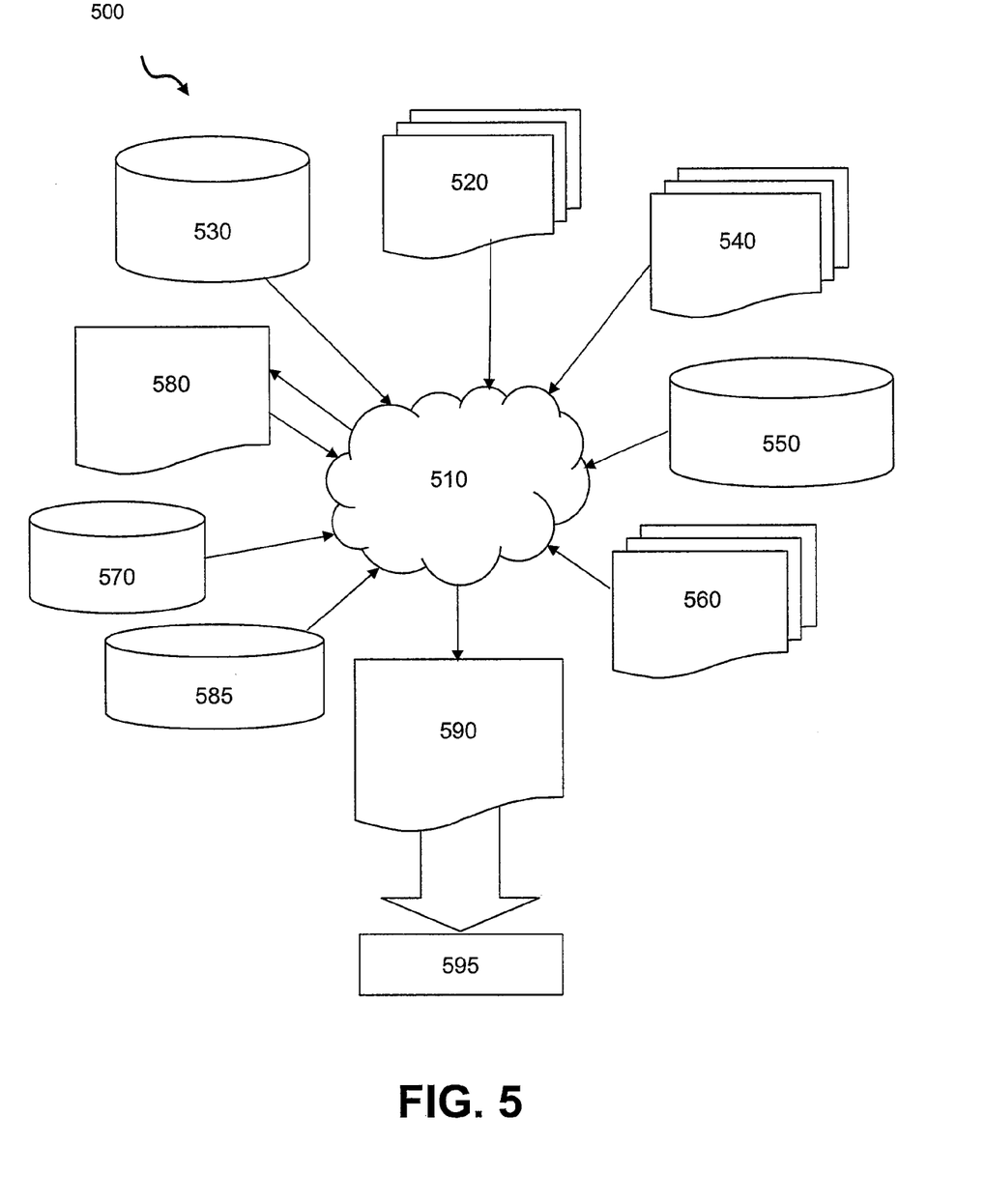
FIG. 5 is a flow diagram of a design process used in semiconductor design, manufacture, and/or test, according to one embodiment of the invention.

FIG. 5 shows a block diagram of an exemplary design flow 500 used for example, in semiconductor IC logic design, simulation, test, layout, and manufacture. Design flow 500 includes processes and mechanisms for processing design structures to generate logically or otherwise functionally equivalent representations of the embodiments of the integrated circuit shown in FIGS. 2-3. The design structures processed and/or generated by design flow 500 may be encoded on machine-readable transmission or storage media to include data and/or instructions that when executed or otherwise processed on a data processing system generate a logically, structurally, or otherwise functionally equivalent representation of hardware components, circuits, devices, or systems.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission or storage medium, design structure 520 may be accessed and processed by one or more hardware and/or software modules within design process 510 to simulate or otherwise functionally represent an electronic component, circuit, electronic or logic module, apparatus, device, or system such as those shown in FIGS. 2-3. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures shown in FIGS. 2-3 to generate a netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 540, characterization data 550, verification data 560, design rules 570, and test data files 585 which may include input test patterns, output test results, and other testing information. Design process 510 may further include modules for performing standard circuit design processes such as timing analysis, verification, design rule checking, place and route operations, etc.

Design process 510 employs and incorporates well-known logic and physical design tools such as HDL compilers and simulation model build tools to process design structure 520 together with some or all of the depicted supporting data structures to generate a second design structure 590. Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-3. In one embodiment, design structure 590 may comprise a compiled, executable HDL simulation model that functionally simulates the devices shown in FIGS. 2-3.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data processed by semiconductor manufacturing tools to fabricate embodiments of the invention as shown in FIGS. 2-3. Design structure 590 may then proceed to a stage 595 where, for example, design structure 590 proceeds to tape-out, is released to manufacturing, is released to a mask house, is sent to another design house, is sent back to the customer, etc.

As described above in the present invention, a remedy to system livelock conditions is presented. Rather than attempt to remedy livelock conditions by changing the instruction sequence in a processor core's pipeline, this invention alters memory instruction access timing in the load/store interface at the point where a livelock is caused. In doing so, this invention achieves a simpler resolution by minimizing the amount and complexity of additional logic required. In addition, the invention achieves a quicker resolution to the livelock issue, when compared to alternate approaches which rely on changing the instruction sequence in a processor core's pipeline. Unlike these alternate approaches, the mechanism completes the resolution of livelock without requiring lengthy flushing and single-step operations for all instructions. Being able to quickly and efficiently resolve livelock conditions, such as address collision conflicts and repeated instruction re-issue, is distinctly advantageous to improving multiprocessor system performance.

While the invention has been particularly shown and described with reference to a preferred embodiment, it will be understood by those skilled in the art that various changes in form and detail may be made therein without departing from the spirit and scope of the invention.

What is claimed is:

1. A non-transitory machine readable storage medium having embodied therein a design structure for designing, manufacturing, or testing an integrated circuit, the design structure comprising:
    a processor load queue for issuing load requests;
    a delay queue, which comprises a delay path including (a) a plurality of initial delay stages including a first stage and associated first staging multiplexer (MUX), (b) a final stage with an associated final staging MUX;
    a feedback path for returning retried operations as an input to the first staging MUX;
    at least one bypass path extending from before one of the plurality of initial delay stages to an input of the final staging MUX;
    a memory subsystem and memory subsystem controller for controlling access to the memory subsystem;
    a livelock detection mechanism that monitors for the occurrence of a livelock condition within the system, wherein said livelock detection mechanism comprises logic for:
        sampling instructions that are sent to the memory subsystem controller; and
        comparing the number of flushes detected against a pre-established threshold value; and a delay queue controller having livelock resolution logic that is activated by the livelock detection mechanism, wherein said delay queue controller responds to the detection of the livelock condition by dynamically changing a selection at said final staging MUX to enable rescheduling of a retried operation ahead of a newer operation at the memory subsystem controller, wherein said livelock resolution logic is automatically activated when the livelock detection mechanism detects a series of flushes corresponding to a load operation that targets a particular cache line but does not complete, and wherein said livelock resolution logic comprises logic for:

in response to the number of flushes being less than the pre-established threshold value, said livelock resolution logic activates a first response to resolve the livelock condition, said first response including a disabling of a delay bypass for new operations received at the delay queue such that all new operations are made to pass through each stage of the delay queue before being presented for selection at the final staging MUX; and     in response to the number of flushes reaching the pre-established threshold value, said livelock resolution logic activates a second response to resolve the livelock condition, said second response including granularly selecting individual instructions from selected ones of the initial delay stages and the feedback path to forward for selection at the final stage MUX, such that a single step instruction processing is enabled;

wherein, when the livelock condition is resolved, said delay queue controller triggers a selection of operations on the bypass path at the final staging MUX.

2. The design structure of claim 1, wherein said final staging MUX receives a select input signal from the detection logic and a first input from the delay path and at least one second input from the at least one bypass path, wherein said final staging MUX is utilized to select one of multiple inputs available for forwarding to the final stage and the memory subsystem controller.

3. The design structure of claim 1, wherein said first response comprises:

triggering the delay queue controller to select, at the final staging MUX, a normal delay path for all new memory access instructions and not the bypass path, wherein all new memory access instructions are sent through the delay stages while a prior load operation that is retried is sent via the bypass path for servicing ahead of the new memory access instructions and is not bypassed by a subsequent load instruction;

whereby the prior load operation is presented to the memory subsystem controller before the next iteration of a subsequent memory access instruction is presented to the memory controller.

4. The design structure of claim 1, wherein:

said at least one bypass path comprises a series of single bypass paths directly linking an input for each of the initial delay stages with an input to the final staging MUX; and the second response comprises:

triggering the delay queue controller to select, at the final staging MUX, one input selected from among an instruction provided on each of the series of bypass paths and an instruction provided on a normal delay path, based on a determination of which instruction should be processed first at the memory subsystem controller to remove the livelock condition.

5. The design structure of claim 1, further comprising:

a snoop controller that detects a broadcasted memory access instruction placed on a system bus for resolution at the memory subsystem controller; and wherein in response to the snoop controller detecting said broadcasted memory access instruction and said broadcasted memory access instruction creates a conflict with one of the memory access instructions generated by the mechanism for issuing memory access instructions that results in a livelock condition, said livelock resolution logic automatically selects the second response.

6. The design structure of claim 5, wherein when the livelock condition is caused by one or more requests snooped on the system bus colliding with the processor's memory access requests, said livelock resolution logic activates the second response method, wherein said delay queue controller automatically adjusts the instruction flow to the a single step instruction processing, whereby the delay queue controller deterministically selects each instruction individually from one of the initial delay stages to send to the final staging MUX via a respective, stage specific bypass path, such that the delay queue controller maintains specific instruction ordering and inserts at least one delay between each instruction.

7. A design structure according to claim 1, further comprising:

a processor having mechanisms for issuing memory access instructions;

a memory subsystem coupled to the processor and which includes data that is accessible for loading and updating via the memory access instructions;

a memory subsystem controller for controlling access by said memory access instructions to said memory subsystem; and a livelock avoidance mechanism that comprises:

a delay queue comprising a plurality of sequentially connected initial delay stages;

a final stage with an associated final staging multiplexer (MUX) for transmitting a memory access request to the memory subsystem controller; and     livelock detection and resolution logic that triggers a selection at the final staging MUX of one of (a) a first instruction on a delay path passing through at least one of the initial delay stages and (b) a second instruction on a bypass path, bypassing at least one of the initial delay stages, so that the correct order of execution of the first instructions relative to the second instruction is provided to the memory subsystem controller to resolve a livelock condition.

8. The design structure of claim 7, further comprising:

a feedback path;

a first multiplexer (MUX) with output coupled to an input of a first of the initial delay stages and utilized to select from among (a) a new memory access instruction received from the mechanism for issuing memory access instructions and (b) a retried instruction provided on the feedback path, wherein the selected instruction is placed in the first of the initial delay stages; and wherein said first MUX is triggered to select the retried instruction on the feedback path ahead of the new memory access instruction.

9. A hardware data processing system having a design structure comprising:

a processor load queue for issuing load requests;

a delay queue, which comprises a delay path including (a) a plurality of initial delay stages including a first stage and associated first staging multiplexer (MUX), (b) a final stage with an associated final staging MUX;

a feedback path for returning retried operations as an input to the first staging MUX;

at least one bypass path extending from before one of the plurality of initial delay stages to an input of the final staging MUX;

a memory subsystem controller for controlling access to a memory subsystem;

a livelock detection mechanism that monitors for the occurrence of a livelock condition within the system, wherein said livelock detection mechanism comprises logic for:
    sampling instructions that are sent to the memory subsystem controller; and
    comparing the number of flushes detected against a pre-established threshold value; and a delay queue controller having livelock resolution logic that is activated by the livelock detection mechanism, wherein said delay queue controller responds to the detection of the livelock condition by dynamically changing a selection at said final staging MUX to enable rescheduling of a retried operation ahead of a newer operation at the memory subsystem controller;

wherein said final staging MUX receives a select input signal from the detection logic and a first input from the delay path and at least one second input from the at least one bypass path, wherein said final staging MUX is utilized to select one of multiple inputs available for forwarding to the final stage and the memory subsystem controller;

wherein said livelock resolution logic is automatically activated when the livelock detection mechanism detects a series of flushes corresponding to a load operation that targets a particular cache line but does not complete;

wherein said livelock resolution logic comprises logic that:
    in response to the number of flushes being less than the pre-established threshold value, said livelock resolution logic activates a first response to resolve the livelock condition, said first response including a disabling of a delay bypass for new operations received at the delay queue such that all new operations are made to pass through each stage of the delay queue before being presented for selection at the final staging MUX; and
    in response to the number of flushes reaching the pre-established threshold value, said livelock resolution logic activates a second response to resolve the livelock condition, said second response including granularly selecting individual instructions from selected ones of the initial delay stages and the feedback path to forward for selection at the final stage MUX, such that a single step instruction processing is enabled; and wherein, in response to the livelock condition being resolved, said delay queue controller triggers a selection of operations on the bypass path at the final staging MUX.

10. The data processing system of claim 9, wherein:
said first response comprises:
triggering the delay queue controller to select, at the final staging MUX, a normal delay path for all new memory access instructions and not the bypass path, wherein all new memory access instructions are sent through the delay stages while a prior load operation that is retried is sent via the bypass path for servicing ahead of the new memory access instructions and is not bypassed by a subsequent load instruction;
whereby the prior load operation is presented to the memory subsystem controller before the next iteration of a subsequent memory access instruction is presented to the memory controller;

said at least one bypass path comprises a series of single bypass paths directly linking an input for each of the initial delay stages with an input to the final staging MUX; and said second response comprises:
triggering the delay queue controller to select, at the final staging MUX, one input selected from among an instruction provided on each of the series of bypass paths and an instruction provided on a normal delay path, based on a determination of which instruction should be processed first at the memory subsystem controller to remove the livelock condition.

11. The data processing system of claim 10, further comprising:
a snoop controller that detects a broadcasted memory access instruction placed on a system bus for resolution at the memory subsystem controller; and wherein in response to the snoop controller detecting said broadcasted memory access instruction and said broadcasted memory access instruction creates a conflict with one of the memory access instructions generated by the mechanism for issuing memory access instructions that results in a livelock condition, said livelock resolution logic automatically selects the second response; and in response to the livelock condition being caused by one or more requests snooped on the system bus colliding with the processor's memory access requests, said livelock resolution logic activates the second response method, wherein said delay queue controller automatically adjusts the instruction flow to the a single step instruction processing, whereby the delay queue controller deterministically selects each instruction individually from one of the initial delay stages to send to the final staging MUX via a respective, stage specific bypass path, such that the delay queue controller maintains specific instruction ordering and inserts at least one delay between each instruction.

12. The design structure of claim 3, wherein the design structure comprises a netlist.

13. The design structure of claim 3, wherein the design structure resides on storage medium as a data format used for the exchange of layout data of integrated circuits.

14. A method in a computer aided design system for generating a functional design model of a circuit, the method comprising:
generating a functional computer-simulated representation of a mechanism for detecting the presence of a livelock condition in a data processing system having a memory subsystem controller and a processor with: a delay queue with a series of initial delay stages; a final stage with a final stage multiplexer (MUX); a feedback path; one or more bypass paths; and livelock detection and resolution logic, wherein the processor comprises a snoop controller that detects a broadcasted memory access instruction placed on a system bus for resolution at the memory subsystem controller;

generating a functional computer-simulated representation of a mechanism for determining whether the livelock condition is a first type livelock condition or a second type livelock condition;

generating a functional computer-simulated representation of a mechanism for detecting via the snoop controller said broadcasted memory access instruction, which creates a conflict with one of the memory access instructions generated by the processor that results in a livelock condition;

generating a functional computer-simulated representation of a mechanism for, in response to the livelock condition being a first type livelock condition, dynamically triggering a delay queue controller to implement a first response for resolving the livelock condition, wherein said first response includes selecting at the final stage MUX an input of a retried instruction ahead of a next input of a subsequent instruction and automatically directing a transmission of each new instruction to the memory subsystem controller via a delay path rather than via a bypass path such that the retried instruction is presented to the memory controller ahead of the subsequent and new instructions; and generating a functional computer-simulated representation of a mechanism for automatically selecting a second response in response to the livelock condition being caused by one or more requests snooped on the system bus colliding with the processor's memory access requests, wherein said delay queue controller automatically adjusts the instruction flow to the a single step instruction processing, whereby the delay queue controller deterministically selects each instruction individually from one of the initial delay stages to send to the final staging MUX via a respective, stage specific bypass path, such that the delay queue controller maintains specific instruction ordering and inserts at least one delay between each instruction.

15. The method of claim 14, wherein:

said generating a mechanism for detecting the presence of a livelock comprises:

generating a functional computer-simulated representation of a mechanism for tracking at least one of a number of flushes of the retried instruction and a number of re-issues of the retried instruction without completing;

generating a functional computer-simulated representation of a mechanism for comparing the number to a preset threshold number; and generating a functional computer-simulated representation of a mechanism for automatically initiating the first response when one of the number of flushes and number of re-issues is below the preset threshold and initiating a second response in response to one of the number of flushes and number of re-issues reaching the preset threshold, such that a mechanism selected for resolving livelock conditions is based on the number of retries and reissues relative to the preset threshold.

16. The method of claim 14, wherein the first and second livelock resolution responses comprises:

generating a functional computer-simulated representation of a mechanism for logically configuring the available bypass paths of the delay queue into a first configuration and a second configuration, respectively; and generating a functional computer-simulated representation of a mechanism for dynamically changing the sequence and timing of handling memory access instructions, based on the particular logical configuration implemented;

wherein said first configuration forces all new memory access operations to proceed through the entire delay queue by disabling the bypass path; and wherein said second configuration freezes the delay queue and selectively forwards any instruction in the delay queue to the memory subsystem controller in an order determined to resolve the livelock condition.

17. The method of claim 16, further comprising:

generating a functional computer-simulated representation of a mechanism for selectively implementing a response associated with the specific logical configuration of the delay queue, wherein:

in response to the first logical configuration being selected, the livelock detection logic (LDL) enables the staging MUX for the final queue stage to select new instructions from the delay queue path rather than the bypass path, wherein all new instructions are delayed while a retried instruction is resent to the memory controller, and is not bypassed; and in response to the second logical configuration being selected, the livelock detection logic (LDL) enables the staging MUX for the final queue stage to instructions out of delay queue order via a single step instruction processing, which maintains specific instruction ordering and adjusts the instruction flow by inserting a delay between each instruction, wherein the delay queue controller deterministically selects, at the final stage MUX, each instruction within a delay stage to forward to the final stage and the memory subsystem controller, wherein each instruction is individually presented for selection via a respective bypass paths preceding the specific delay stage in which the instruction is next placed.

* * * * *